6045X
3 Sheets—Sheet 1.
T. HURD & J. FOX.
MACHINE FOR NAPPING CLOTH.
Patented June 23, 1830.
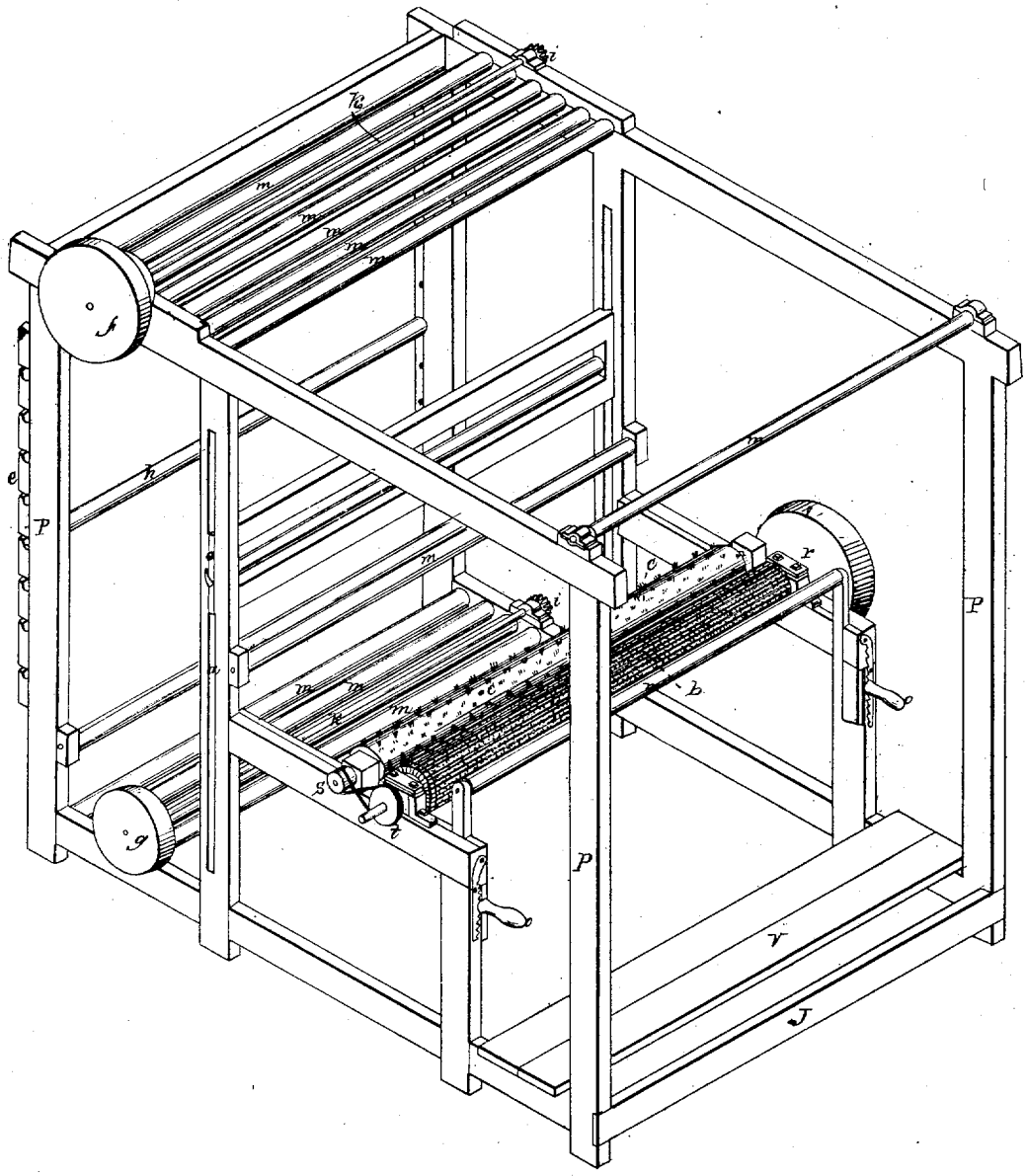
THE NORRIS PETERS CO., PHOTO-LITHO., WASHINGTON, D. C.

6045X
3 Sheets—Sheet 2.
T. HURD & J. FOX.
MACHINE FOR NAPPING CLOTH.
Patented June 23, 1830.
*Side Elevation*
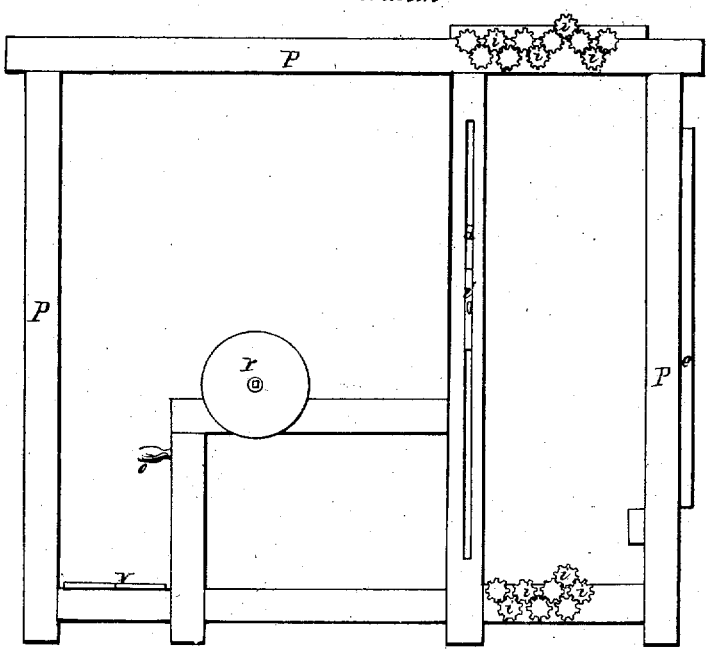
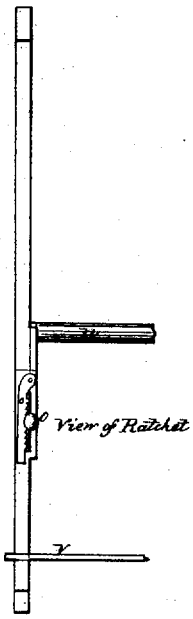
*Section of Brush.*
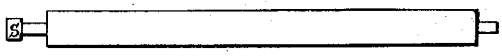
*Napper.*
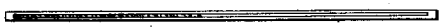
*Section of Cylinder.*
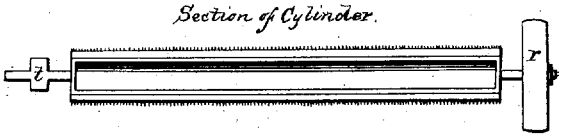
*Roller frame.*
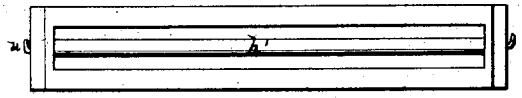
THE NORRIS PETERS CO., PHOTO-LITHO., WASHINGTON, D. C.

6045X
T. HURD & J. FOX.
3 Sheets—Sheet 3.
MACHINE FOR NAPPING CLOTH.
Patented June 23, 1830.
*End Elevation*
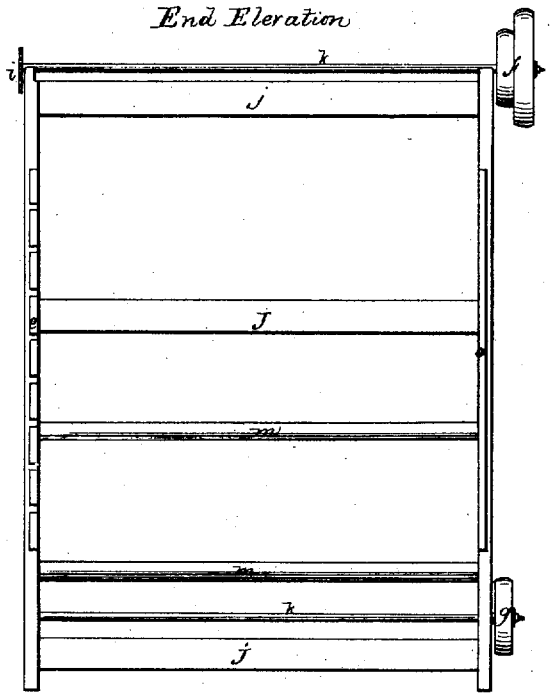
*Side Elevation.*
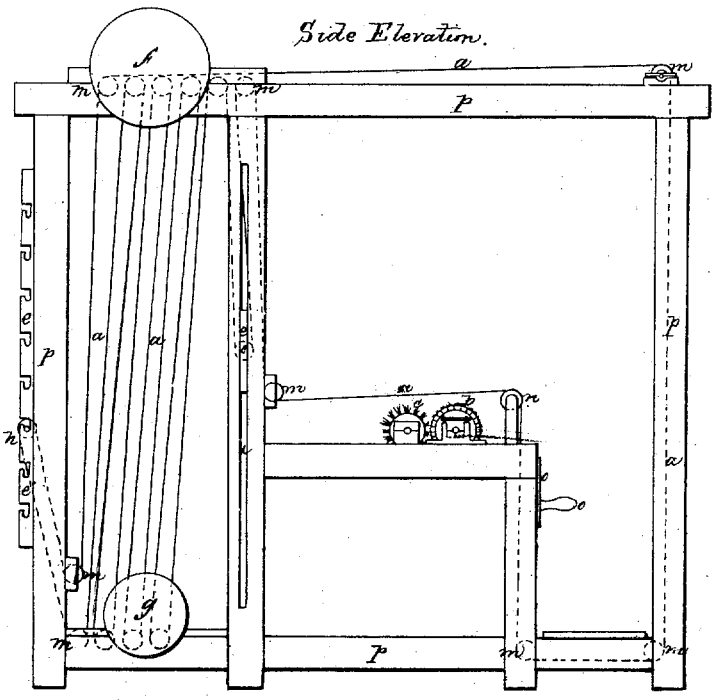
THE NORRIS PETERS CO., PHOTO-LITHO., WASHINGTON, D. C.

X6045 June 29. 1830

Thomas Hurd & Jesse Fox. Citizens of

Letters Patent.

The Schedule referred to in these Letters Patent and making part of the same, containing a description in the words of the said Thomas Hurd & Jesse Fox themselves of their improvement in the mode of raising, straightening, & laying the nap on woollen cloths, & cloths on which a nap is commonly raised by teasing.

To all to whom these presents shall come. we Thomas Hurd, of the City of New York, in the County and State of New York, and Jesse Fox, of Lowell in the County of Middlesex, and State of Massachusetts, send Greeting. Be it known that we the said Thomas Hurd and Jesse Fox, have invented, constructed, made and applied to use, a new and useful improvement in the mode of raising straightening and laying the nap on woollen cloths and cloths on which a nap is commonly raised by teasing which invention and the principle thereof and the mode in which we have contemplated the application thereof, and the manner of using, and process of compounding the same are described as follows, that is to say. It is best that the operation should be performed upon the cloth whilst it is heated with steam or hot air and stretched so as to make it straight, free from wrinkles and even, where it is to be teased which teasing is to be done with pointed metallic wires or pins set and fixed compactly together, or very nearly so, and parallel with each other having the points all one way and upon the circumference of the same circle or upon the same plane having regard to the intended use of them whether upon a cylinder or a plane. These Metallic pointed wires, pins, or points, thus set and fixed compactly or closely or very near to each other, being very numerous can be made to act upon many points of the cloth at once. will serve as guards to each other require but a light touch and pressure of the cloth upon them while the operation is going on in order to accomplish the work without taking such hold of the cloth cons

[illegible]

[illegible]. X6045 so as to injure it and may be made to operate lightly upon the cloth, so
as to raise an uniform nap upon it with much more facility and
expedition and in a far better manner than a nap can be raised upon
cloth by cards, teazles or any other mode or means hitherto in use.
These points ought in general to be as near to each other as those of
pointed brass wires numbered twenty two when set compactly together
or very nearly so in order to operate with them most advantageous
-ly. they may however be set a little nearer or farther apart according to
the kind and quality coarseness or fineness of the cloth to be operated
upon. These pointed metallic wires, pins, or metallic points may be made
or formed of brass or other metal of about the same hardness or harder
Any metal sufficiently hard and tough will answer the purpose. But
this metal is deemed preferable as not being liable to rust, and being
deemed sufficiently hard. When these pointed metallic wires or pins
are to be put in frames as hereinafter mentioned; brass wires num-
bered twenty two cut into pieces of about three fourths of an inch
long, and pointed nearly like the common brass pin, but with a point
a little more tapering will serve best, but the common brass pin of
ordinary size with the head removed will answer the purpose tolerably
well. But if these pointed metallic wires or pins are to be set in holes
perforated or made in metallic plates plates as hereinafter mentioned,
the wires ought to be much smaller. They may be so small that the end
of the wire will require but very little sharpening to bring it to a point
or so that the end may serve for a point, and if the holes in the plate be
made very near to each other these very small wires or pins when
inserted as hereinafter mentioned being so numerous and near
together will be sufficiently stiff. These pointed metallic wires
pins, or metallic points may be set or fixed upon a plane to be used
as hand jacks, or upon a revolving cylinder. The best mode of opera
-ting with them is when set or fixed upon a cylinder. The cylinder
may be made of brass or other metal of about the same hardness or
harder and may be made hollow so as to contain steam or hot air by
which it should be heated so as to heat the points and keep them hot

X6045 but while the operation of teasing is going on and aid in the process of
raising, straightening and laying them up as well as in expelling the flocks
or down produced by friction which have a tendency to lodge between
the points. The steam or hot air may be sent into the barrel of the cylinder
through a tube going into the end of the arbor or axle of the cylinder and from
thence into the barrel. But heat may be applied to the points by means
of a shell connected with a box into which steam or hot air can be ad-
mitted and partly encircling the cylinder upon which the points are
set or fixed so that the points may be heated by revolving in the shell.
They should be heated in order to operate best with them. The operation
of teasing with these points however may be performed tolerably well
without heating the points, by heating the cloth by steam to be sent
into a tube passing under the cloth just before and near to the cylinder
and having a slit in it from whence the steam can be made to issue
up and strike upon and heat the cloth as well as wet it. And it is
best to apply the steam in this way as well as to heat the cylinder as
before described. Cloth may nevertheless be teased without either
the heating of the cylinder or the application of steam as before
described, but these are deemed advantageous in the operation.
The metallic points or pins may be set or fixed upon the cylinder
in various ways. The pointed brass wires or pins may be fixed in
metallic oblong frames of the length of the cylinder made of brass, copper
or iron encompassing a space to be filled with the pins of the width
of one half of an inch more or less according to the size of the cylinder and
as long as the widest cloths intended to be teased. These pointed
brass wires or pins must be filled into the spaces encompassed by the
frames compactly and parallel with each other, and crowded
tightly together with the points all one way until the spaces are filled
so as to form as solid compact a mass as may be and so that the points
shall project and be about three sixteenths of an inch or a little
more above the outer surface of the metallic frames, and so that
the points shall form a convex surface, corresponding with
the circumference of the cylinder, or of about the same convexity.
This

X6045

This may be done when putting them into the frames by setting them
with the points downward in a concave metallic mould of a cor-
responding concavity placed under the frame. The sides of the [illegible]
frame should be about three fourths of an inch deep and about five
thirty seconds of an inch wide or so wide that the frame shall be of
sufficient firmness and strength. The lower or blunt ends of the pointed
wires or pins after they have been thus filled and crowded tightly into
the frame, should be soldered to each other and to the frame which may
be done while the points are resting on the concave mould with common
solder so as to secure them firmly together and to the frame. The pointed
brass pins are more easily soldered when tinned or prepared like the common
pins, and in order to prevent the solder from running through to the points.
Moist clay may be laid in the bottom of the mould about one quarter of
an inch deep or of convenient depth in which whilst moist and soft,
the points are to be set and the clay should then be suffered to become
dry and hard, after which and just before pouring the solder upon
the blunt ends of the pointed wires they should be heated by placing
them whilst so set by a fire and the solder should be poured upon them
whilst they remain hot. The frames thus filled with the pointed
metallic wires or pins so put in and soldered may be laid upon the
convex surface of the cylinder upon which they are to be used in the
form of lags with the points outward and fastened firmly to the cylin-
der by screws through the frame at the ends and in the middle of the sides
of the frames or otherwise. The whole convex surface of the cylinder must be thus
covered with these frames fixed and fastened to it and filled with pointed
metallic wires or pins so as to cover every part of the convex surface of the
cylinder and to present a surface of points set as uniformly as may be
together excepting the spaces occupied by the metallic frames within
which the pointed metallic wires or pins are to be set. Or the pointed wires
or pins may be fixed and held firmly together in the frames by [illegible]
or may be set [illegible] and fastened in any way in which they [illegible] be held
or kept near together with sufficient firmness, the [illegible]
[illegible] the pointed metallic wires or pins on the cylinder [illegible]
they they are to be used is by making metallic plates of suitable width
and length corresponding with the length and convexity of the cylin-
ders and perforating, punching or making holes in these plates as near
to each other as may be and leave enough of plate to hold the pins just
large enough to admit the blunt ends of the pointed metallic wires or
pins. In these holes pointed metallic brass wires numbered about twenty
eight more or less, or steel wires of a much smaller size, or of a size
much smaller than the pins used for filling the frame as before
mentioned and about three eighths of an inch long or a little more or
less according to the thickness of the plate which may be of the
thickness of about number twenty three or what is commonly
called twenty four ounce copper more or less if the plates be of
that metal should be inserted so that the blunt ends may be even
with the under surface of the plates. and the points must be
graduated by a concave mould so as to conform to the surface
of the cylinder on which they are to be used. These pointed metallic
wires or pins thus set in the plates may be soldered to the plate on
the side opposite to the points with common solder by means of a
mould attached thereto so that the solder can be poured in between the
plate and the mould sufficient in quantity to secure the points to the
plate and to each other. These plates thus prepared and filled with
pointed wires or pins must be laid on the convex surface of the
cylinder with the points outward and secured firmly to it by screws
or otherwise until the concave surface of the cylinder is covered
with the plates. When a cylinder with the metallic points is intended
only for smoothing and laying the nap, the points may be set and
fixed in either of the modes above described at such an angle with
the circumference of the cylinder as in the operation to have little
or no action upon the threads of the cloth but to smooth and lay the nap
The cylinder upon which the pointed metallic wires points or pins
are set and fixed in any of the modes before mentioned may be
driven or turned round with great velocity in the process of raising
straightening and laying the nap by the power of steam or water
by

X6045 by connecting the cylinder which is to be fixed in a frame with bolts
to a drum. and the cloth while passing over the cylinder should be made
to touch the points lightly and its pressure upon the points may be
graduated by a roller near the cylinder over which it passes connect-
ed with ratchets so that the roller may be raised or lowered as oc-
casion may require. The cloth may be stretched upon rollers
in any of the various modes now in use while it is made to
pass over the cylinder. When the pointed metallic wires are to be
used upon a plane as hand jacks or otherwise they may be
set in either of the modes above mentioned excepting that the points
in this case ought to be even with each other or in the same plane.
When the operation is to be performed by points set or made upon a
cylinder a revolving cylinder brush having a motion contrary to the
cylinder containing the points, should be so fixed as to be in contact
with the points on that cylinder in order to assist in clearing the
flocks or down from between the points. Kersimeres and cloths
of a similar kind may be stretched and made to pass over the cylin-
der in the following manner. The two ends of the cloth in the process
of teasing should be sewed or connected together and the cloth
should be made to pass alternately over and under revolving rollers
fixed in a frame sufficient in number to take up the whole of the
cloth so that no part of it may hang loose and so that it may
pass over the cylinder in which the points are and that the
surface on which a nap is to be raised straightened and laid
may be made to touch the points lightly as it passes over the
cylinder. And one of the revolving rollers next to the cylinder should
be so fixed in a moveable frame set in grooves that by means of
handles and ratchets before mentioned the frame may be raised
or lowered and with it the roller set in it so as to let the surface of
the cloth to be teased down upon the points, or raise it and gradu-
ate the action or friction of the points upon the cloth at the dis-
cretion of the operator. The cloth, during the operation of raising
straightening and laying the nap should be stretched and kept stretched stretched lengthwise so as to make the surface of the cloth on
which the nap is to be raised as straight even and free from
wrinkles as possible, which may be done by having one of the
revolving rollers under which the cloth passes fixed in a move=
able frame made to slide in a groove or mortise through the posts
in the main frame capable of being moved up and down, at
the two ends of which frame weights of sufficient magnitude to
stretch the cloth are to be suspended upon hooks to be fixed upon
this frame. The cloth should also be stretched widthwise which
may be done with the hand or any other convenient way. A rotary
motion is given to the cloth by the revolving of the rollers over
and under which it passes and is stretched and which causes
it to pass over the cylinder in which the metallic points are set
and fixed. But Satinetts and cloths of that kind may be better
stretched in the modes now in common use. The description
above given may be better understood by reference to the plans
hereto annexed marked A.B.C, and the explanation thereof which
is as follows, that is to say. Plan A exhibits a side elevation and an
end elevation of the frame in which the metallic cylinder with
points the cylindrical brush and the rollers over and under which
the cloth passes are set. Plan B. exhibits also a side elevation
of the frame with a view of the pullies, ratchets, a section of the
brush, a section of the metallic cylinder with points one of the
metallic frames in which the points are to be set and the moveable
frame containing a roller with the hooks attached to the frame
from which the weights to stretch the cloth are suspended.
Plan C. exhibits a view of the frame with the metallic cylin
=der, cylindrical brush and rollers set in it. a a a a a, are lines
which represent the cloth with the two ends connected stretched
and passing by a rotary motion over and under the rollers and
over the cylinder in which the metallic points are set and fixed
while the cylinder is revolving with great velocity. b repre=
sents a hollow metallic cylinder on which the metallic points

X 6043 points are set and fixed and which cylinder being set in the
frame may be driven by the force of steam or water or other-
wise being turned by means of a belt passing over a driving pulley
connected with the arbor at one end of the cylinder so as to communi-
cate motion from a revolving drum. c represents a revolving cylin-
drical brush set also in the frame and in contact with the metallic
points which are upon the revolving metallic cylinder and
having a driving pulley connected by a cross belt with a pulley
at the end of the cylinder so as to give the brush a motion in a direction
contrary to the motion of the cylinder for the purpose of clearing
the down or flocks from between the points d represents a groove
or mortise through the posts in the main frame for the moveable
frame to slide in to which the weights for stretching the cloth are
hung and wherein a roller under which the cloth passes is
set. e represents the moveable frame sliding in the groove or
mortice d for raising the roller h to different heights f represents
a double pulley with which belts are to be connected for giving
motion to the rollers by means of gear g represents a single
pulley for the like purpose and by means of a belt to connect the
motion of the upper and lower rollers h represents the roller
set in the moveable frame under which roller the cloth passes
and is stretched by means of weights suspended to hooks fas-
tened in each end of the frame. iiiiiii represent stud gear
or cog wheels to regulate the motion of the rollers so that they
may move in one and the same direction. jjjj represent six
braces to the frame in which the rollers cylindrical brush
and metallic cylinder are set. k k represent the axis of the pullies
with gear for giving motion to the rollers, m m m m m m m m m
represent rollers over or under which the cloth passes and from
which it receives its motion. n represents a shifting roller to be
set and used in any part of the frame e as the different lengths of
the cloths may give occasion. o represents the roller set in a
moveable frame for letting the cloth down upon the points
set set and fixed on the metallic cylinder or raising it. o o.
represent the handles and ratchets for raising and lowering
the rollers r r over which the cloth passes whereby its touch
and pressure upon the points on the metallic cylinder may be
graduated. PPPP represent principal parts of the main frame.
r represents the driving pulley to the metallic cylinder. s repre-
sents the small pulley for the band to play upon to turn the
cylindrical brush. t represents a small pulley at one end
of the metallic cylinder connected by a band to the pulley at
one end of the brush crossed so as to turn the brush in a direction
contrary to that in which the cylinder moves. u represents the
hooks attached to the moveable frame from which the weights
are suspended. v represents a platform for the workman to
stand upon. From these plans and the above description
it is believed that the mode of operating in teasing cloth
which is deemed best with the points set and fixed as before
mentioned may be easily understood. In general it is
best that the cloth to be teased should be wet at the time
of teasing it. The operation however may be performed
in various ways with or without the application of heat
or steam, and the cloth may be stretched while the
operation of teasing is going on by various other means
than those above described. The size and length of the wires
whether set or fixed in frames, or in or upon metallic plates or a
metallic substance may be varied at discretion and when set in
or upon metallic plates, or a metallic substance these wires may
be so small that the ends will serve as points with little or no sharpen-
ing, and these metallic wires pins or points may be set and fixed nearly
together in any way in which they can be secured firmly in their places
and may be used on a plane or upon a cylindrical surface, and if they
be put on a cylinder in frames or plates this cylinder may be hollow
or solid and of metal or wood if it be of sufficient strength and the
size of the cylinder may be varied at discretion. And as metallic
wires

X6045 wires set and fixed in the manner of the common cards in leather
or felt at a considerable distance from each other upon a plane or
upon a cylindrical surface have heretofore been used for the
purpose of teasing and raising a nap upon cloth, it is to be dis-
tinctly understood that wires so set, and such cards and the
setting or fixing of wires or pins in such manner as last aforesaid or in
any manner in which they have heretofore been set and used for the
purpose aforesaid, is not claimed as a new invention. The chief
advantage arising from our invention consisting in the setting and
fixing of pointed metallic wires pins or points or wires or pins so
small that the ends may serve for points with little or no sharpening
in a firm manner in frames or in or upon metallic plates or in
or upon a Metallic substance or any substance in or upon which
they may be so set and fixed with sufficient firmness compactly,
closely or very nearly together, and much nearer to each other than
they have heretofore been placed set or fixed on any such cards
in leather felt or otherwise so that the points may the better
serve as gages to each other, act upon many points of the cloth
at once require but a light touch or pressure of the cloth upon
them in order to accomplish the work and without taking such
rank hold upon the cloth as to injure it raise a nap uniformly
thereon with much more facility and expedition and in a far better
manner than can be done by the cards or teasles aforesaid or
any mode or means hitherto in use. And notwithstanding that
we have mentioned and recommended the application of heat in
steam & water in the operation, and described a mode of operating
and Machinery which is deemed advantageous in the use of our
invention but which may be used or not or varied at the
discretion of the Mechanic or operator and which a Mechanic
of ordinary skill will readily understand. We hereby neverthe-
less explicitly declare that what is claimed by us as a new
invention and improvement, and all which we the said Hurd
and Fox, claim herein as our original invention and improvement
is the

X6045 is the setting placing or fixing pointed metallic wires .. pins or points, and wires so small that the end may serve for points with little or no sharpening compactly closely or very near to each other in metallic frames or any frames of sufficient strength and durability or in or upon metallic plates or in or upon a metallic substance or any substance in or upon which they may be so set and fixed with sufficient firmness upon a plane or convex surface for the purpose of being used when so set fixed made or placed firmly and near to each other as aforesaid for teasing and raising straightening and laying the nap upon woollen cloth and cloth upon which a nap is usually raised by teasing and so much and such parts and no more of the instruments and machines above described and of any instrument or machine for teasing cloth as is constituted by or composed of Metallic wires pins or points so set placed or fixed firmly in Metallic frames or in or upon metallic plates or in or upon a Metallic or other substance compactly closely or near to each other as aforesaid.

In witness whereof we the said Thomas Heard, and Jesse Fox, have hereunto set our hands and seals this twenty seventh day of March in the year of our Lord one thousand eight hundred and thirty.

Signed sealed and executed
in presence of us —

Thomas Heard (Seal)
Jesse Fox – (Seal)

Augustus H. Fiske } Witnesses to the
Thomas A. Dexter } signature and seal of and execution by Jesse Fox, W. H. [illegible] } Witnesses to the signature
[illegible] } and seal of and execution
John Marden } by Thomas Heard (4550 Words) Cyd. [illegible]